3,062,817
4,4'-DIHYDROXY-3,3'-DIALKOXY-5,5'-BIS-(MOR-PHOLINOMETHYL)-HYDROBENZOIN
Charles F. Geschickter, Kensington, Md., and Jacob R. Meadow, Lexington, Ky., assignors to The Geschickter Fund for Medical Research, Inc., Washington, D.C., a corporation of New York
No Drawing. Filed Feb. 11, 1960, Ser. No. 7,991
3 Claims. (Cl. 260—247.5)

This application relates to hydrovanilloin compounds and more particularly to morpholine derivatives of hydrovanilloin compounds.

In the search for new drugs, it is a never-ending quest of the researcher to uncover compositions and formulations in general having a given utility yet which may be inexpensively prepared. It is as well desirable to develop such drugs having a degree of versatility in use, i.e., drugs which can be administered orally as well as by injection.

It is the primary object of this invention to develop hydrovanilloin compounds having utility in the drug field and possessing the above-described characteristics.

It is another principal object of the present invention to develop morpholine derivatives of hydrovanilloin and ethyl hydrovanilloin which are particularly useful in the treatment of arteriosclerosis and other afflictions and yet which are inexpensively prepared, non-toxic, highly soluble and which can be administered orally or by injection.

Other, more particular objects will appear as the description proceeds in connection with the invention.

The compounds to which the instant invention relates are the morpholine Mannich derivatives of hydrovanilloin (4,4'-dihydroxy-3,3'-dimethoxyhydrobenzoin) and ethyl hydrovanilloin (4,4' - dihydroxy - 3,3' - diethoxyhydrobenzoin). Included in the derivatives of these compounds to which the instant invention is directed are 4,4'-dihydroxy - 3,3' - dimethoxy - 5,5' - bis - (morpholino - methyl)-hydrobenzoin and 4,4'-dihydroxy-3,3'-diethoxy-5,5'-bis-(morpholinomethyl)-hydrobenzoin.

The intermediate hydrovanilloin and ethyl hydrovanilloin may be prepared as follows:

I. Hydrovanilloin

This compound was prepared electrolytically by a method similar to that described by Pearl (I. M. Pearl, J. Am. Chem. Soc., 74, 4261 (1952)). One hundred grams (0.656 mole) of vanillin was electrolyzed for five hours at six amperes in a cell described briefly as follows: the electrodes were constructed of commercial plumbers' sheet lead weighing three pounds per square foot. The cathode was eight square decimeters in area and was prepared to fit into a three liter beaker. It enclosed a 20 x 8 cm. porous cup which served as a diaphragm and anode compartment. The anode area of the lead sheet was about one-tenth that of the cathode. In all cases, the electrolyte was 2 N aqueous sodium hydroxide. After five hours the product was precipitated with sulfur dioxide, washed with water and dried to give approximately 70 grams of bright prisms having a melting point of 234–6° C. (instantaneous melting point on heated block). If melted slowly, the product decomposes at 222–4° C. After recrystallization from dioxane-water, the product melted at 241–3° C. (235–8° C. decomposition range if melted slowly).

II. Ethyl Hydrovanilloin

This intermediate glycol was prepared in a manner similar to that for hydrovanilloin. One hundred grams (0.602 mole) of ethyl vanillin was dissolved in 1.5 liters of 2 N sodium hydroxide and electrolyzed for ten hours at six amperes with lead electrodes as described previously. The product was precipitated with sulfur dioxide, filtered, washed well with water and dried to give about 90 grams of white powder having a melting point of 224–5° C. (instantaneous melting point on heated block). If melted slowly, the product decomposes at 205–210° C. Recrystallization from dioxane-water resulted in the formation of small clear prisms having a melting point of 225–7° C. (instantaneous melting point on heated block).

The morpholine derivatives forming the subject matter of the instant invention are derived as follows:

III. 4,4'-Dihydroxy-3,3'-Dimethoxy-5,5'-Bis-(Morpholinomethyl)-Hydrobenzoin 6.0 grams (.02 mole) of hydrovanilloin, 12 grams (0.133 mole) of redistilled morpholine, and 70 ml. of absolute ethyl alcohol were mixed together. 8.0 grams (0.10 mole) of 40% aqueous formaldehyde was then added cautiously to this mixture, which was cooled by means of an ice bath to prevent rapid overheating of the solution. After being permitted to stand at room temperature for about one hour, the resulting slurry was allowed to reflux gently on a water bath for a period of four hours. About 1 or 2 grams of decolorizing charcoal was then added and the mixture was filtered while hot. The clear filtrate was evaporated to slightly less than one-half its original volume, cooled to allow crystallization, and filtered. Six and one-tenth grams of small colorless crystals having a melting point of 195–7° C. were obtained. Recrystallization from ethyl alcohol produced a product melting at 199–200° C. The over-all yield of 4,4'-dihydroxy-3,3'-dimethoxy-5,5'-bis-(morpholinomethyl)-hydrobenzoin after recrystallization was approximately 52%.

IV. 4,4'-Dihydroxy-3,3'-Diethoxy-5,5'-Bis-(Morpholinomethyl)-Hydrobenzoin

This compound was prepared in a manner similar to that used for the dimethoxy derivative. The initial mixture was formed from 6.7 grams (0.02 mole) of ethyl hydrovanilloin, 50 ml. of 95% ethyl alcohol, and 5 grams (0.058 mole) of redistilled morpholine. Four grams (0.049 mole) of 40% aqueous formaldehyde was then slowly added to the cold mixture while agitating and the resulting slurry allowed to stand at room temperature for one hour. The slurry was then placed in a round-bottom flask and allowed to reflux for four hours on a water bath. The contents of the flask were then concentrated by evaporation under reduced pressure to one-half the original volume, about 10% (by vol.) water added, and the mixture chilled overnight. About 9.5 grams of nearly white crystals having a melting point of 172–4° C. were filtered off. Recrystallization from ethyl alcohol produced a white crystalline powder having a melting point of 178–180° C.

The morpholine derivatives of the instant invention are useful as estrogenic hormones and will have no side effects on the reproductive organs of the human body. They may be used to control blood cholesterol and are as well suited for the control of arteriosclerosis. The most important use of these derivatives has been in controlling hypothyroid conditions and for treatment of anginal attacks. In normal mammals, the derivatives have a stabilizing effect on blood lipids.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. As a composition of matter, 4,4'-dihydroxy-3,3'-dialkoxy-5,5'-bis-(morpholinomethyl)-hydrobenzoin, wherein said dialkoxy radical is selected from the group consisting of diethoxy and dimethoxy.

2. The composition defined in claim 1 wherein said dialkoxy radical is diethoxy.

3. The composition defined in claim 1 wherein said dialkoxy radical is dimethoxy.

References Cited in the file of this patent

UNITED STATES PATENTS 2,903,454     Richter et al. _____ Sept. 8, 1959

OTHER REFERENCES

Burckhalter et al.: Journal of the American Chemical Society, vol. 68, page 1900 (1946).

Pearl: Journal of the American Chemical Society, vol. 74; pages 4593 and 4594 (1952).